(12) United States Patent
Howard

(10) Patent No.: US 6,895,901 B1
(45) Date of Patent: May 24, 2005

(54) DOG DIAPER SYSTEM

(76) Inventor: Sandra Smith Howard, 8112 Somerset Dr., Largo, FL (US) 33773

( * ) Notice: Subject to any disclaimer, the term of this patent is extended or adjusted under 35 U.S.C. 154(b) by 0 days.

(21) Appl. No.: 10/463,919

(22) Filed: Jun. 18, 2003

(51) Int. Cl.[7] ............................................. A01K 23/00
(52) U.S. Cl. .................................................... 119/869
(58) Field of Search ........................ 119/850, 854, 867, 119/868, 869

(56) References Cited

U.S. PATENT DOCUMENTS

| | | | | |
|---|---|---|---|---|
| 4,290,386 A | * | 9/1981 | Eiriksson | 119/868 |
| 4,577,591 A | * | 3/1986 | Wesseldine | 604/391 |
| 5,005,525 A | * | 4/1991 | Stanton | 604/385.14 |
| 5,146,874 A | * | 9/1992 | Vidal | 119/868 |
| 6,142,105 A | * | 11/2000 | McKnight | 119/850 |
| 6,368,313 B1 | * | 4/2002 | Howard | 604/385.09 |
| 6,454,735 B1 | * | 9/2002 | Hamada | 602/61 |
| 6,557,497 B1 | * | 5/2003 | Milligan | 119/850 |

FOREIGN PATENT DOCUMENTS

| | | | |
|---|---|---|---|
| EP | 958741 A2 | * | 11/1999 |
| JP | 02002238394 A | * | 8/2002 |

* cited by examiner

Primary Examiner—Son T. Nguyen
(74) Attorney, Agent, or Firm—Edward P. Dutkiewicz

(57) ABSTRACT

A dog diaper system comprising pants having a central section and a lower section and an upper section and a pair of side sections. The pants have an interior surface positionable adjacent to the dog wearing the pants and an exterior surface. An upper strap has a free first end stitched to the upper section adjacent to one side section and a second end coupled to the upper section adjacent to the other side section. Fasteners are attached to the surface of the side sections for coupling the pants to a dog.

2 Claims, 4 Drawing Sheets

DOG DIAPER SYSTEM

BACKGROUND OF THE INVENTION

1. Field of the Invention

The present invention relates to a dog diaper system and more particularly pertains to precluding in-house damage caused by dog urination while maximizing the comfort to the dog.

2. Description of the Prior Art

The use of diaper systems of known designs and configurations is known in the prior art. More specifically, diaper systems of known designs and configurations previously devised and utilized for the purpose of minimizing in-house damage caused by dog urination through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,290,386 to Eiriksson discloses a dog sanitary device of a type including a harness and a removable receptacle. U.S. Pat. No. 4,444,152 to Berardo discloses a device for collection of animal wastes. U.S. Pat. No. 4,510,887 to Lincoln et al. discloses an animal fecal collection system. U.S. Pat. No. 4,813,949 to O'Rourke discloses a dog diaper. U.S. Pat. No. 4,996,949 to Wunderman discloses disposable dog diaper. U.S. Pat. No. 5,005,525 to Stanton discloses an animal marking and urination control device. U.S. Pat. No. 5,555,847 to Kelly discloses a dog diaper. U.S. Pat. No. 5,662,640 to Daniels discloses a puppy training diaper. U.S. Pat. No. 5,934,226 to Moore et al. discloses a bird diaper. Lastly, U.S. Pat. No. US2003/0066495 to Soars discloses a dog diaper.

While these devices fulfill their respective, particular objectives and requirements, the aforementioned patents do not describe a dog diaper system that allows precluding in-house damage caused by dog urination while maximizing the comfort to the dog.

In this respect, the dog diaper system according to the present invention substantially departs from the conventional concepts and designs of the prior art, and in doing so provides an apparatus primarily developed for the purpose of precluding in-house damage caused by dog urination while maximizing the comfort to the dog.

Therefore, it can be appreciated that there exists a continuing need for a new and improved dog diaper system which can be used for precluding in-house damage caused by dog urination while maximizing the comfort to the dog. In this regard, the present invention substantially fulfills this need.

SUMMARY OF THE INVENTION

In view of the foregoing disadvantages inherent in the known types of diaper systems of known designs and configurations now present in the prior art, the present invention provides an improved dog diaper system. As such, the general purpose of the present invention, which will be described subsequently in greater detail, is to provide a new and improved dog diaper system and method which has all the advantages of the prior art and none of the disadvantages.

To attain this, the present invention essentially comprises a dog diaper system for precluding in-house damage caused by dog urination while maximizing the comfort to the dog. First provided are pants adapted to be worn over the hindquarters of a dog. The pants have a central section positionable adjacent to the stomach of a dog wearing the pants. The pants also have a lower section terminating in a lower end formed with a tunnel positionable between the legs of a dog wearing the pants. The pants also have an upper section shaped as a trapezoid terminating in an upper end positionable adjacent to the chest of a dog wearing the pants. The pants also have a pair of similarly configured side sections positionable around the waist of a dog wearing the pants. Each side section terminates in a side end adapted to overlap when being worn by a dog. Each side section also has an upper edge and a lower edge.

The pants and its sections are integrally formed of a fabric. The entire pants and its sections have an interior surface positionable adjacent to the dog wearing the pants. The pants also have an exterior surface exposed and adapted to have decorative indicia thereon.

Next provided is an elastic upper strap having a free first end stitched to the upper end of the upper section adjacent to one side section. The upper strap also has a second end and an upper loop stitched to the upper end of the upper section adjacent to the other side section. An upper slider is slidably received on an intermediate extent of the upper strap. The second end of the upper strap passes through the upper loop and is attached to the upper slider. The upper strap is adjustably positionable around the neck of a dog for allowing a proper fitting to dogs of varying lengths.

Next provided is an elastic lower strap having a free first end stitched to the lower edge of one side section. The lower strap also has a second end with a lower loop stitched to the lower edge of the other side section. A lower slider is slidably received on an intermediate extent of the lower strap with the second end of the lower strap passing through the tunnel and through the lower loop and attached to the lower slider. The lower strap is adjustably positionable around the legs of a dog for allowing a proper fitting to dogs of varying lengths.

A patch of a hook and loop fastener is attached to the exterior surface of one side section. A patch of a hook and loop fastener attached to the interior surface of the other side section to facilitate at adjustable securement of the pants to a dog.

An elastic thread is stitched into each side section with the material being gathered in the side sections adjacent to the elastic threads. This allows for limited expansion and contraction of the side sections when worn by a dog.

Lastly provided is a pad. The pad has an interior surface formed of an absorbent material interiorly in contact with the dog. The pad also has an exterior surface formed of a moisture impervious plastic material extending rearwardly from adjacent to the upper section rearwardly through the central section and to the lower section.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dog diaper system which has all of the advantages of the prior art diaper systems of known designs and configurations and none of the disadvantages.

It is another object of the present invention to provide a new and improved dog diaper system which may be easily and efficiently manufactured and marketed.

It is further object of the present invention to provide a new and improved dog diaper system which is of durable and reliable constructions.

An even further object of the present invention is to provide a new and improved dog diaper system which is susceptible of a low cost of manufacture with regard to both materials and labor, and which accordingly is then susceptible of low prices of sale to the consuming public, thereby making such dog diaper system economically available to the buying public.

Even still another object of the present invention is to provide a dog diaper system for precluding in-house damage caused by dog urination while maximizing the comfort to the dog.

Lastly, it is an object of the present invention to provide a new and improved dog diaper system comprising pants having a central section and a lower section and an upper section and a pair of side sections, the pants having an interior surface positionable adjacent to the dog wearing the pants and an exterior surface; an upper strap having a free first end stitched to the upper section adjacent to one side section and a second end coupled to the upper section adjacent to the other side section; and fasteners attached to the surface of the side sections for coupling the pants to a dog.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
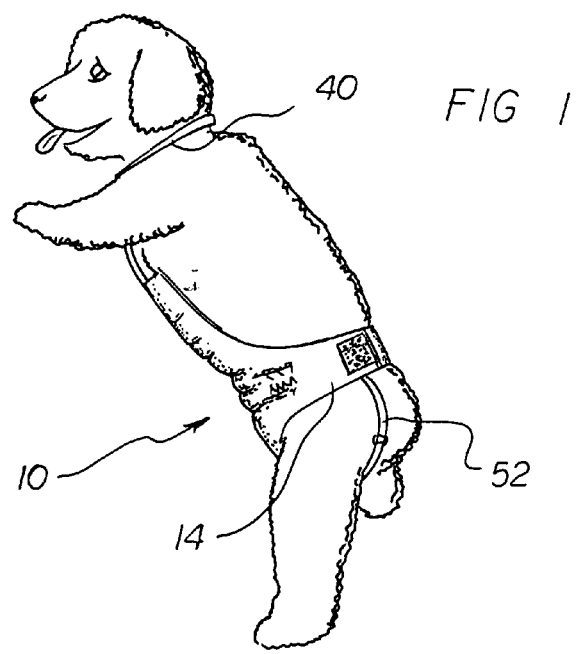
FIG. 1 is perspective view of the dog diaper system constructed in accordance with the principles of the present invention.
Figure 2:
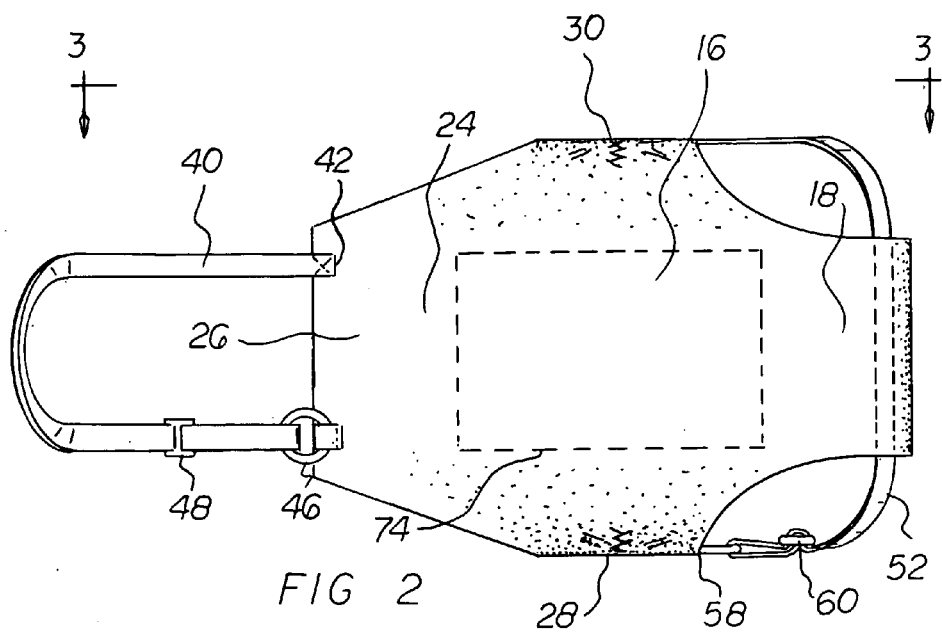
FIG. 2 is a bottom view of the dog diaper system shown in FIG. 1.
Figure 3:
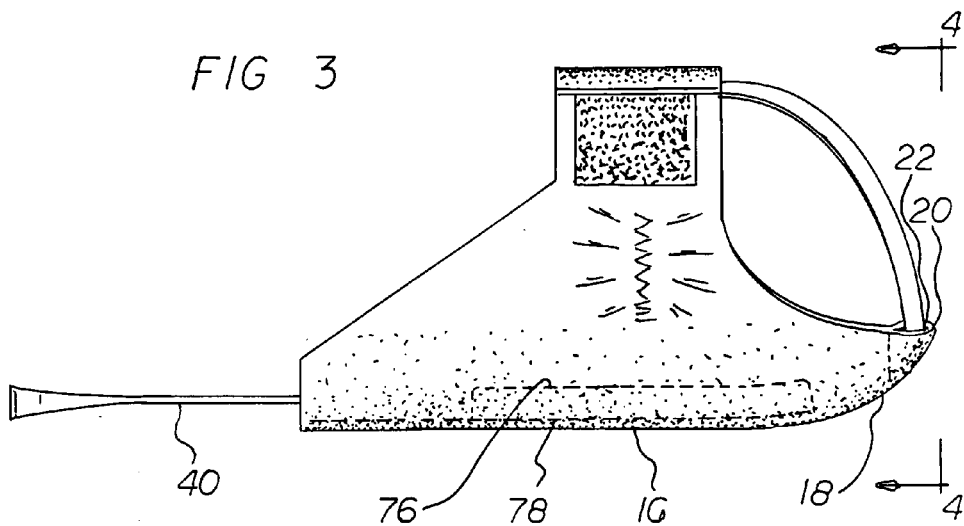
FIG. 3 is side elevational view taken along line 3—3 of FIG. 2.
Figure 4:
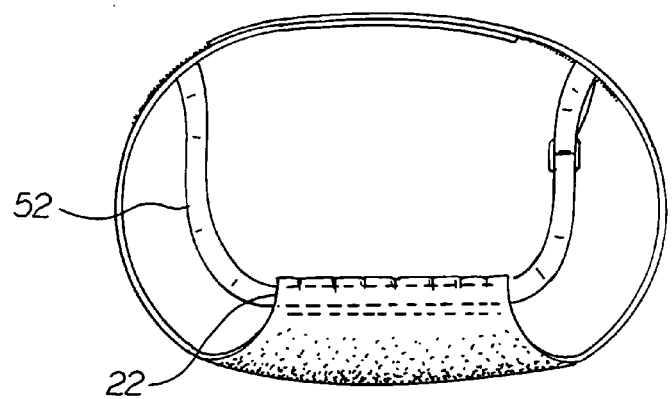
FIG. 4 is a rear elevational view of the system taken along line 4—4 of FIG. 3.

With reference now to the drawings, and in particular to FIG. 1 thereof, the preferred embodiment of the new and improved dog diaper system embodying the principles and concepts of the present invention and generally designated by the reference numeral 10 will be described.

The present invention, the dog diaper system 10 is comprised of a plurality of components. Such components in their broadest context include pants, an upper strap, a lower strap, and a fastener. Such components are individually configured and correlated with respect to each other so as to attain the desired objective.

First provided are pants 14. The pants are adapted to be worn over the hindquarters of a dog. The pants have a central section 16 positionable adjacent to the stomach of a dog wearing the pants. The pants have a lower section 18 terminating in a lower end 20 formed with a tunnel 22. The lower section and tunnel are positionable between the legs of a dog wearing the pants. The pants also have an upper section 24 shaped as a trapezoid and terminating in an upper end 26. By trapezoid it is meant a four sided figure or quadrilateral having only two sides parallel. The upper section is positionable adjacent to the chest of a dog wearing the pants. The pants also have a pair of similarly configured side sections 28, 30 which are positionable around the waist of a dog wearing the pants. Each side section terminates in a side end 32, 34. The side sections are adapted to overlap when being worn by a dog. Each side section also has an upper edge 36 and a lower edge 38.

Figure 5:
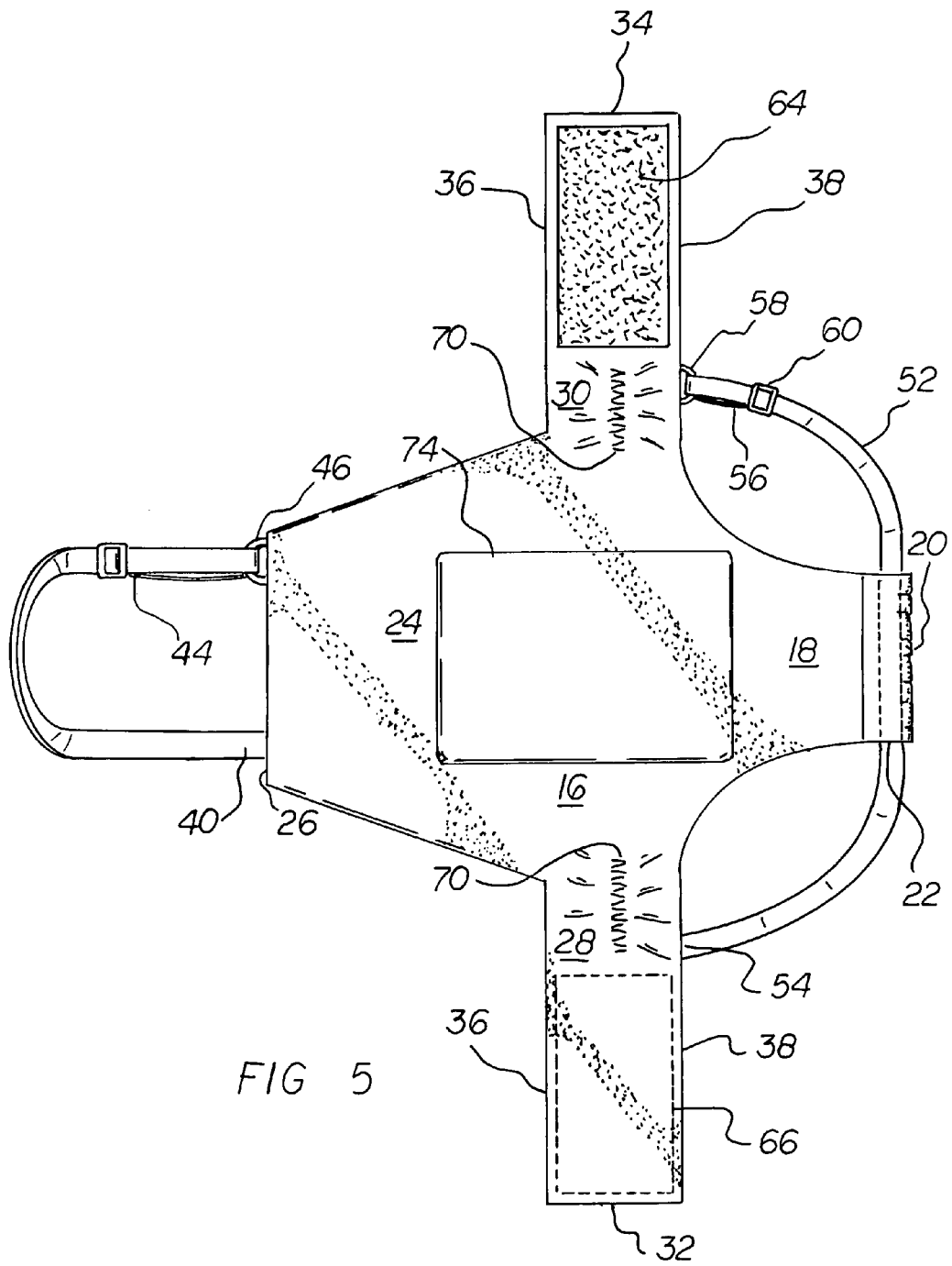
FIG. 5 is a bottom view of the system similar to FIG. 1 but viewed from the interior surface of the system.

As can be seen in FIG. 5, the length of the upper section is greater than the length of the lower section which is greater than the central section. Such lengths are measured from the upper edge of the upper section to the lower edge of the lower section.

The pants and its sections are integrally formed of a fabric, natural of synthetic, or blends thereof, as for example cotton or a plastic. The entire pants and its sections have an interior surface positionable adjacent to the dog wearing the pants. The pants also have an exterior surface exposed and adapted to have decorative indicia thereon.

Next provided is an elastic upper strap 40. The upper strap has a free first end 42 stitched to the upper end of the upper section adjacent to one side section. The upper strap also has a second end 44 and with an upper loop 46 stitched to the upper end of the upper section adjacent to the other side section. An upper slider 48 is slidably received on an intermediate extent of the upper strap. The second end of the upper strap passes through the upper loop and is attached to the upper slider. The upper strap is adjustably positionable around the neck of a dog for allowing a proper fitting to dogs of varying lengths.

Next provided is an elastic lower strap 52. The lower strap has a free first end 54 stitched to the lower edge of one side section. The lower strap also has a second end 56 with a lower loop 58 stitched to the lower edge of the other side section. A lower slider 60 is slidably received on an intermediate extent of the lower strap with the second end of the lower strap passing through the tunnel and through the lower loop and attached to the lower slider. The lower strap is adjustably positionable around the legs of a dog for allowing a proper fitting to dogs of varying lengths.

A patch 64 of a hook and loop fastener is attached to the exterior surface of one side section. A patch 66 of a hook and loop fastener is attached to the interior surface of the other side section to facilitate at adjustable securement of the pants to a dog.

An elastic thread 70 is stitched into each side section. The material of the pants is gathered in the side sections adjacent to the elastic threads to allow for limited expansion and contraction of the side sections when worn by a dog.

Lastly provided is a pad 74 having an interior surface 76 formed of an absorbent material interiorly in contact with the dog. The pad also has an exterior surface 78 formed of a moisture impervious plastic material extending rearwardly from adjacent to the upper section rearwardly through the central section and to the lower section. An adhesive is preferably utilized to couple the pad to the pants.

Figure 6:
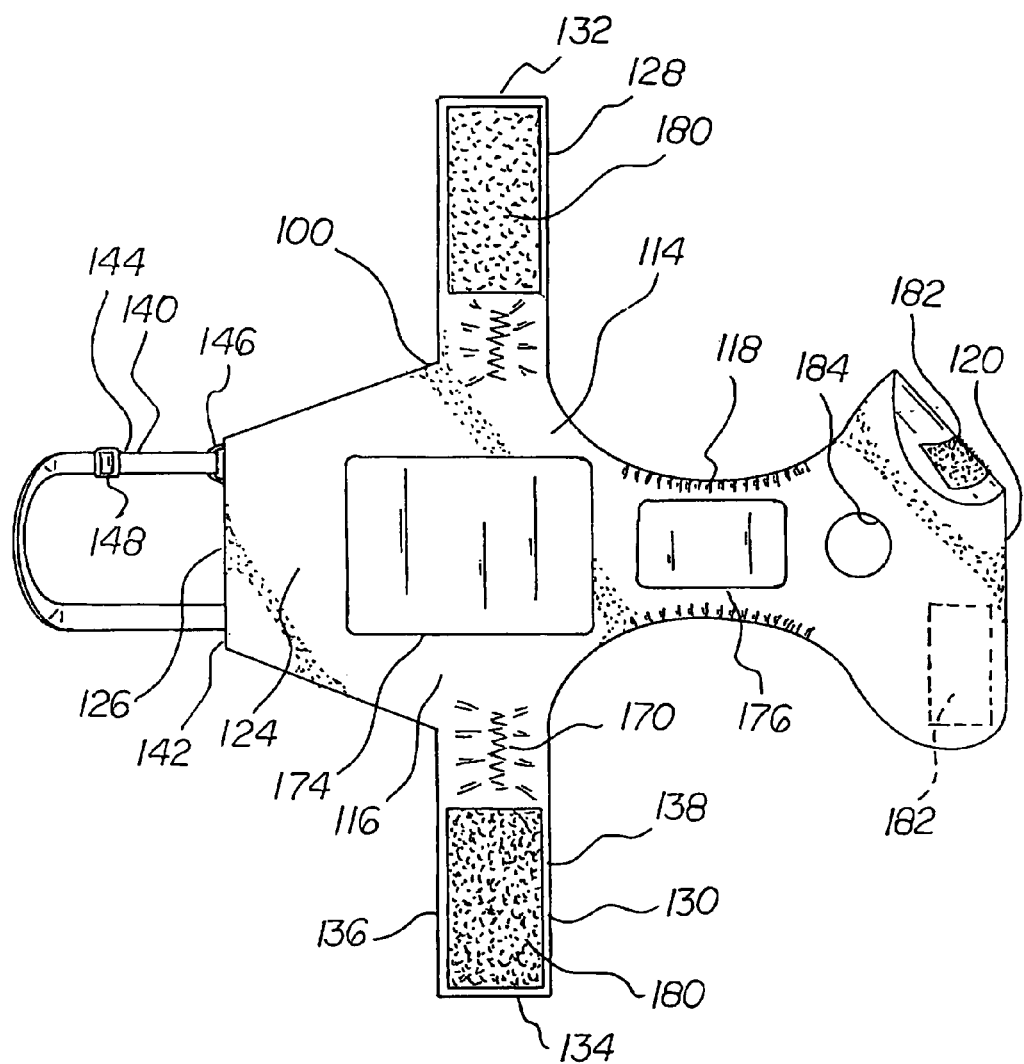
FIG. 6 is a bottom view similar to FIG. 5 but illustrating an alternate embodiment of the invention.

An alternate embodiment of the invention is shown in FIG. 6. Such embodiment is a system 100 particularly adapted for use by female dogs. First provided are pants 114. The pants are adapted to be worn over the hindquarters of a dog. The pants have a central section 116 positionable adjacent to the stomach of a dog wearing the pants. The pants have a lower section 118 terminating in a lower end 120. The lower section is positionable between the legs of a dog wearing the pants. The pants also have an upper section 124 shaped as a trapezoid and terminating in an upper end 126. The upper section is positionable adjacent to the chest of a dog wearing the pants. The pants also have a pair of similarly configured side sections 128, 130 which are positionable partially around the waist of a dog wearing the pants. Each side section terminates in a side end 132, 134. Each side section also has an upper edge 136 and a lower edge 138.

As can be seen in FIG. 6, the length of the lower section is greater than the length of the upper section which is greater than the central section.

Next provided is an elastic upper strap 140. The upper strap has a free first end 142 stitched to the upper end of the upper section adjacent to one side section. The upper strap also has a second end 144 and with an upper loop 146 stitched to the upper end of the upper section adjacent to the other side section. An upper slider 148 is slidably received on an intermediate extent of the upper strap. The second end of the upper strap passes through the upper loop and is attached to the upper slider. The upper strap is adjustably positionable around the neck of a dog for allowing a proper fitting to dogs of varying lengths.

The lower section 118 is of a length greater than the length of the upper section 116 which is, in turn, greater than the length of the central section 118. The middle region of the lower section 118 is of a reduced lateral extent to fit comfortably between the legs of the dog wearing the system. A pad 176 is positionable in this middle region. A tail hole 184 is also formed in the lower section 118 between the pad and the lower edge 120. Securement of the pants to the dog is preferably through hook and loop fasteners. Such fasteners include hook and loop fasteners 180 on the interior surface of side sections 128, 130 in combination with hook and loop fasteners 182 on the exterior surface of lower section 118 adjacent to the lower edge whereat the lower section is of an enlarged lateral extent.

An elastic thread 170 is stitched into each side section. The material of the pants is gathered in the side sections adjacent to the elastic threads to allow for limited expansion and contraction of the side sections when worn by a dog.

Lastly provided are pads, an upper pad 174 and a lower pad 176. Each pad has an interior surface formed of an absorbent material interiorly in contact with the dog. Each pad also has an exterior surface formed of a moisture impervious plastic material. The upper pad 174 is positioned as in the primary embodiment for use by a male dog. The lower pad 176 is positioned in a middle region of the lower section, between the central section and the tail hole 184, for use by a female dog. The upper pad may be used without the lower pad, and the lower pad may be used without the upper pad. It is also possible to use both pads at the same time. An adhesive is preferably utilized to couple the pads to the pants.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dog diaper system for precluding in-house damage caused by dog urination while maximizing the comfort to the dog comprising, in combination:

pants adapted to be worn over the hindquarters of a dog, the pants having a central section positionable adjacent to the stomach of a dog wearing the pants and the pants having a lower section terminating in a lower end formed with a tunnel positionable between the legs of a dog wearing the pants and the pants and having an upper section shaped as a trapezoid terminating in an upper end positionable adjacent to the chest of a dog wearing the pants and the pants having a pair of similarly configured side sections positionable around the waist of a dog wearing the pants, each side section terminating in a side end adapted to overlap when being worn by a dog, each side section also having an upper edge and a lower edge;

the pants and its sections being integrally formed of a fabric, the entire pants and its sections having an interior surface positionable adjacent to the dog wearing the pants and an exterior surface exposed and adapted to have decorative indicia thereon;

an elastic upper strap having a free first end stitched to the upper end of the upper section adjacent to one side section, the upper strap also having a second end, and with an upper loop stitched to the upper end of the upper section adjacent to the other side section, and with an upper slider slidably received on an intermediate extent of the upper strap and with the second end of the upper strap passing through the upper loop and attached to the upper slider, the upper strap being adjustably positionable around the neck of a dog for allowing a proper fitting to dogs of varying lengths;

an elastic lower strap having a free first end stitched to the lower edge of one side section, the lower strap also having a second end, and with a lower loop stitched to the lower edge of the other side section, and with a lower slider slidably received on an intermediate extent of the lower strap and with the second end of the lower strap passing through the tunnel and through the lower loop and attached to the lower slider, the lower strap being adjustably positionable around the legs of a dog for allowing a proper fitting to dogs of varying lengths;

a patch of a hook and loop fastener attached to the exterior surface of one side section and a patch of a hook and loop fastener attached to the interior surface of the side section to facilitate at adjustable securement of the pants to a dog;

an elastic thread stitched into each side section with the material being gathered in the side sections adjacent to the elastic threads to allow for limited expansion and contraction of the side sections when worn by a dog; and a pad having an interior surface formed of an absorbent material interiorly in contact with the dog and having an exterior surface formed of a moisture impervious plastic material extending rearwardly from adjacent to the upper section rearwardly through the central section and extending to the lower section.

2. A dog diaper system comprising:

pants having a central section and a lower section and an upper section and a pair of side sections, the pants having an interior surface positionable adjacent to the dog wearing the pants and an exterior surface;

an upper strap having a free first end stitched to the upper section adjacent to one side section and a second end coupled to the upper section adjacent to the other side section; and separate fasteners attached to the surface of the side sections for coupling the pants to a dog wherein the length of the upper section is greater than the length of the lower section which is greater than the central section, such lengths being measured from the upper edge of the upper section to the lower edge of the lower section and further including an elastic lower strap having a free first end stitched to the lower edge of one side section, the lower strap also having a second end, and with a lower loop stitched to the lower edge of the other side section, and with a lower slider slidably received on an intermediate extent of the lower strap and with the second end of the lower strap passing through a tunnel at the lower end of the lower section and through the lower loop and attached to the lower slider, the lower strap being adjustably positionable around the legs of a dog for allowing a proper fitting to dogs of varying lengths, and wherein the fasteners include a patch of a hook and loop fastener attached to the exterior surface of one side section and a patch of a hook and loop fastener attached to the interior surface of the side section to facilitate at adjustable securement of the pants to a dog.

* * * * *